United States Patent
Horvath Szabo et al.

(10) Patent No.: US 9,638,016 B2
(45) Date of Patent: May 2, 2017

(54) METHODS OF TREATING SUBTERRANEAN FORMATIONS WITH FLUIDS COMPRISING PROPPANT CONTAINING PARTICLE

(71) Applicant: SCHLUMBERGER TECHNOLOGY CORPORATION, Sugar Land, TX (US)

(72) Inventors: Geza Horvath Szabo, Sugar Land, TX (US); Mohan Kanaka Raju Panga, Katy, TX (US); Sergey Semenov, Kurgan (RU); Andrey Yakovlev, Houston, TX (US); Maxim Yutkin, Novosibirsk (RU); Karina Bagdasarova, Chekhov (RU)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 140 days.

(21) Appl. No.: 14/536,395

(22) Filed: Nov. 7, 2014

(65) Prior Publication Data
US 2015/0129213 A1    May 14, 2015

(30) Foreign Application Priority Data
Nov. 13, 2013 (WO) ................ PCT/RU2013/001010

(51) Int. Cl.
*E21B 43/267* (2006.01)
*C09K 8/80* (2006.01)
*E21B 43/04* (2006.01)
*C09K 8/50* (2006.01)
*C09K 8/528* (2006.01)

(52) U.S. Cl.
CPC ............ *E21B 43/267* (2013.01); *C09K 8/805* (2013.01); *E21B 43/04* (2013.01); *C09K 8/50* (2013.01); *C09K 8/528* (2013.01)

(58) Field of Classification Search
CPC .. C09K 8/805; C09K 8/62; C09K 8/80; E21B 43/267; E21B 33/138
See application file for complete search history.

(56) References Cited

U.S. PATENT DOCUMENTS

| | | |
|---|---|---|
| 7,275,596 B2 | 10/2007 | Willberg et al. |
| 8,003,214 B2 | 8/2011 | Rediger et al. |
| 8,044,000 B2 | 10/2011 | Sullivan et al. |
| 2008/0108524 A1 | 5/2008 | Willberg et al. |
| 2008/0135245 A1 | 6/2008 | Smith et al. |
| 2009/0176667 A1 | 7/2009 | Nguyen |
| 2010/0089581 A1 | 4/2010 | Nguyen et al. |
| 2010/0314114 A1 | 12/2010 | Moradi-Araghi et al. |
| 2011/0120719 A1 | 5/2011 | Soane et al. |
| 2013/0233545 A1 | 9/2013 | Mahoney et al. |

FOREIGN PATENT DOCUMENTS

| | | |
|---|---|---|
| EA | 200701378 A1 | 6/2008 |
| EP | 1985682 A1 | 10/2008 |

OTHER PUBLICATIONS

International Search Report and Written Opinion issued in PCT/RU2013/001010 on Aug. 21, 2014, 8 pgs.

*Primary Examiner* — Zakiya W Bates
(74) *Attorney, Agent, or Firm* — Michael L. Flynn; Jody Lynn DeStefanis; Robin Nava

(57) ABSTRACT

A method is provided for treating at least a portion of a subterranean formation. The method includes introducing a treatment fluid including a composite particle, which includes proppant incorporated into or attached to a swellable material and/or swellable materials, into a subterranean formation via a wellbore; and increasing the buoyancy of the composite particle including proppant by either mixing it with a treatment fluid or mixing it with a treatment fluid and triggering the swellable material and/or swellable materials to swell.

25 Claims, 5 Drawing Sheets

High Stirring Rate

Medium Stirring Rate

High Stirring Rate

Medium Stirring Rate

METHODS OF TREATING SUBTERRANEAN FORMATIONS WITH FLUIDS COMPRISING PROPPANT CONTAINING PARTICLE

CROSS REFERENCE TO RELATED APPLICATIONS

This application claims the benefit of and priority to PCT Patent Application having serial number PCT/RU2013/001010 that was filed on 13 Nov. 2013, which is incorporated by reference herein in its entirety.

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a treatment fluid to interact with a subterranean formation in a manner that ultimately increases oil or gas flow from the formation to the wellbore for removal to the surface.

In the process of acquiring oil and/or gas from a well, the flow of hydrocarbons may be increased via hydraulic fracturing. The term "fracturing" refers to the method of pumping a fluid into a well until the pressure increases to a level which is sufficient to fracture the subterranean geological formations containing the entrapped materials. This results in cracks and breaks that disrupt the underlying layer to allow the hydrocarbon product to be carried to the well bore at a higher rate. Unless the pressure is maintained, the newly formed openings close. In order to open a path and maintain it, a particulate propping agent or proppant is introduced along with the hydraulic fluid to create the support to preserve the opening.

In order to place the proppants inside the fracture, proppants are suspended in a fluid that is then pumped to its subterranean destination. To prevent the proppants from settling, a high viscosity fluid is often used to suspend them. If the proppants were incorporated into composite particles that could be activated to be more buoyant, a less viscous suspension fluid could be used, which would still convey the particles to the target area but would be easier to pump into the formation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates a method for treating a subterranean formation including introducing a treatment fluid including a composite particle, which includes proppant incorporated into or attached to a swellable material and/or swellable materials, into a subterranean formation via a wellbore; and increasing the buoyancy of the composite particle including proppant by either mixing it with a treatment fluid or mixing it with a treatment fluid and triggering the swellable material and/or swellable materials to swell.

BRIEF DESCRIPTION OF THE DRAWINGS

The manner in which the objectives of the present disclosure and other desirable characteristics may be obtained is explained in the following description and attached drawings in which.

DETAILED DESCRIPTION

Figure 1:
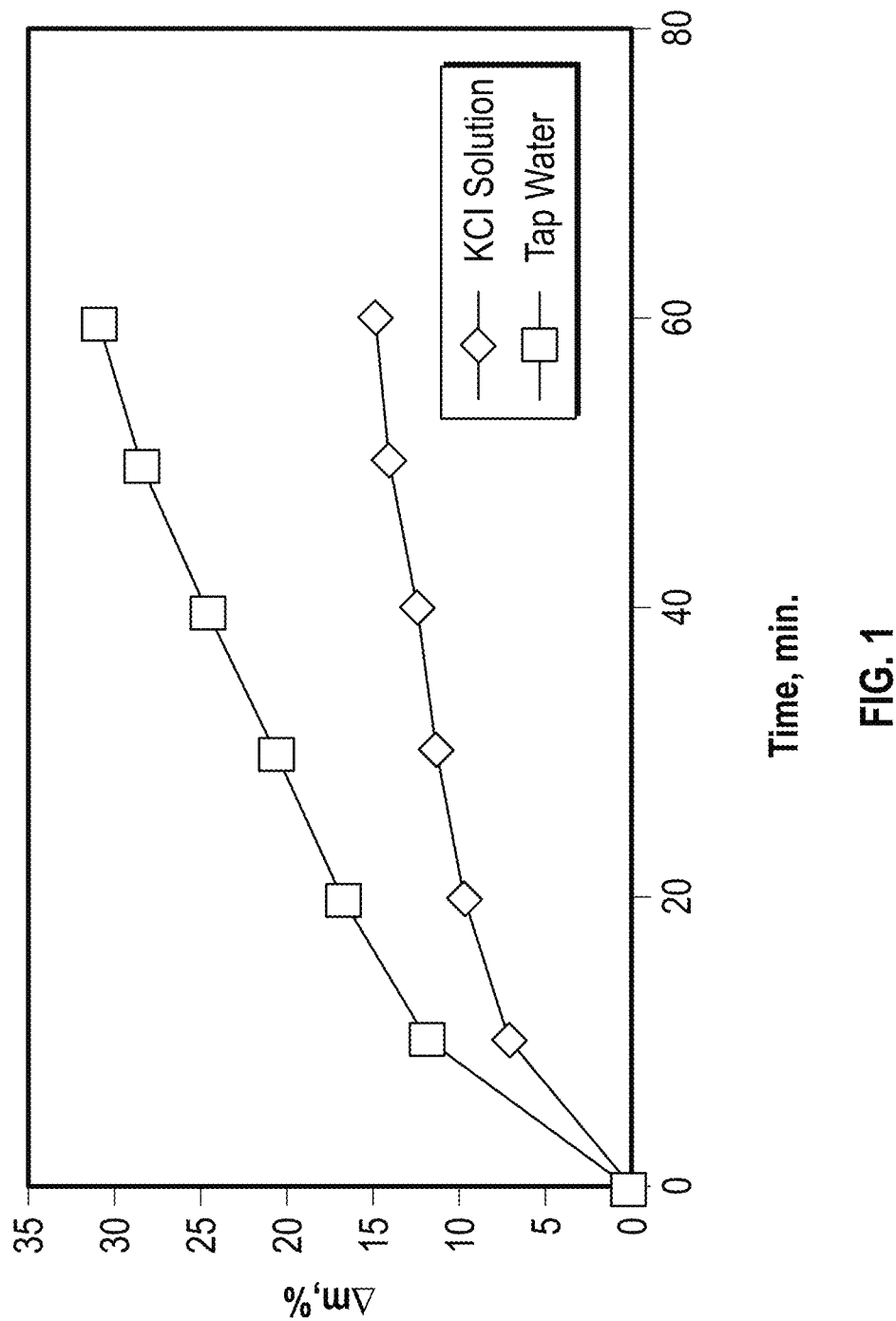
FIG. 1 is an illustration of data relating to swelling properties of homogenously crosslinked CMC/sand particles.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a range listed or described as being useful, suitable, or the like, is intended to include support for any conceivable sub-range within the range at least because every point within the range, including the end points, is to be considered as having been stated. For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Finally, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

When hydraulic fracturing is applied in hydrocarbon reservoirs to increase the production rate of hydrocarbons from the reservoir, the primary objective of the well treatment is to increase the production surface area of the formation. Between this increased surface area and the production well, a flow path of higher conductivity than the formation has to be situated. To increase the surface area, high pressure is used, which fractures the rock. In the methods of the present disclosure, to establish the high conductivity path, the full closure of the formed fractures is prevented by placing composite particles comprising proppant in the fracture gap.

The composite particles comprising proppant of the present disclosure are delivered into the fracture via a treatment fluid, such as a fracturing fluid. In embodiments, the methods of the present disclosure may avoid proppant sedimentation, which may (1) limit the maximum depth the proppant can be delivered into the formation and (2) result in vertically inhomogeneous proppant placement. In embodiments, the application of the methods of the present disclosure may eliminate or reduce the sedimentation of the proppant particles. For example, in some embodiments, the density of at least some of the composite particles comprising proppant may not be higher than the density of the treatment fluid, and thus at least a portion of the proppant introduced into the fracture may not settle. In some embodiments, the densities of at least some of the composite particles comprising proppant are lower than the density of the proppant, and thus at least a portion of the proppant introduced into the fracture may have a reduced sedimentation rate.

As used herein, the term "treatment fluid," refers to any pumpable and/or flowable fluid used in a subterranean operation in conjunction with a desired function and/or for a desired purpose. Such fluids may be modified to contain either composite particles comprising proppant (and/or aggregated composite particles comprising proppant) incorporated into swellable material, or composite particles comprising proppant (and/or aggregated composite particles comprising proppant) and swellable material incorporated into a third material, which can be highly viscous or cross-linked material or both.

As used herein, the term swelling "triggering event" refers to any action that is sufficient to initiate the swelling of the swellable material of the composite particles comprising proppant (and/or aggregated composite particles comprising proppant). For example, the terms "trigger", "triggering" and "triggered," as used herein, may include exposing the swellable material of the composite particles comprising proppant (and/or aggregated composite particles comprising proppant) to a mechanical means, physical means, chemical means, thermal means and other means to initiate, catalyze, or otherwise induce or cause the swellable material to transform from a non-swelled form to a swelled form. In some embodiments, the swelling triggering event may be any condition that results in the swelling of the swellable material, such as, for example, a pH change, a temperature change, a change in the ionic concentration (including formation of poly-electrolyte complexes), a change in hydrophobicity, and/or a change in the solvent composition.

The methods of the present disclosure may be used to treat at least a portion of a subterranean formation. The term "treat," "treatment," or "treating," does not imply any particular action by the fluid. For example, a treatment fluid placed or introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a driller fluid, a frac-packing fluid, or gravel packing fluid. The methods of the present disclosure may include forming composite particles comprising proppant (and/or aggregated composite particles comprising proppant). The treatment fluids comprising composite particles comprising proppant (and/or aggregated composite particles comprising proppant), may be used in full-scale operations, pills, or any combination thereof. As used herein, a "pill" is a type of relatively small volume of specially prepared treatment fluid placed or circulated in the wellbore.

As used herein, the term "treating temperature," refers to the temperature of the treatment fluid that is observed while the treatment fluid is performing its desired function and/or desired purpose, such as fracturing a subterranean formation.

The term "fracturing" refers to the process and methods of breaking down a geological formation and creating a fracture, such as the rock formation around a wellbore, by pumping a treatment fluid at very high pressures (pressure above the determined closure pressure of the formation), in order to increase production rates from or injection rates into a hydrocarbon reservoir. The fracturing methods of the present disclosure may include composite particles comprising proppant (and/or aggregated composite particles comprising proppant), but otherwise use conventional techniques known in the art.

In some embodiments, the treatment fluids of the present disclosure (and composite particles comprising proppant (and/or aggregated composite particles comprising proppant) formed during the methods of the present disclosure) may be introduced during methods that may be applied at any time in the life cycle of a reservoir, field or oilfield. For example, the methods and treatment fluids of the present disclosure may be employed in any desired downhole application (such as, for example, stimulation) at any time in the life cycle of a reservoir, field or oilfield.

In embodiments, the treatment fluids of the present disclosure, which comprise composite particles comprising proppant (and/or aggregated composite particles comprising proppant), may be formed at the surface and placed or introduced into a wellbore; or the components of the treatment fluids may be separately placed or introduced into a wellbore and mixed downhole. A "wellbore" may be any type of well, including, a producing well, a non-producing well, an injection well, a fluid disposal well, an experimental well, an exploratory deep well, and the like. Wellbores may be vertical, horizontal, deviated some angle between vertical and horizontal, and combinations thereof, for example a vertical well with a non-vertical component.

The term "field" includes land-based (surface and subsurface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

The methods of the present disclosure may include introducing a treatment fluid into the subterranean formation, wherein the treatment fluid comprises composite particles including proppant (and/or aggregated composite particles comprising proppant) incorporated into a swellable material; swelling the swellable material, wherein the swelling event is performed prior to, during, or after the step of introducing the treatment fluid; and, optionally, degrading the swellable material either in the subterranean formation or in the well or at the wellhead, wherein the degradation of the swellable material may be performed after the swelling event is performed.

In some embodiments, the composite particles comprising proppant (and/or aggregated composite particles comprising proppant) may comprise one or more particles of a proppant surrounded by one or more swellable materials, such as a low-density swellable material, or a low-density material that forms after one or more swellable material is activated by a swelling triggering event to transition into a material that is less dense than the proppant.

In some embodiments, an average aspect ratio of the composite particles comprising proppant (and/or aggregated composite particles comprising proppant) may be in the range of from about 1 to about 100, or in the range of from about 1 to about 10, or in the range of from about 1 to about 2. In embodiments, an average diameter of the composite particles comprising proppant (and/or aggregated composite particles comprising proppant) is in the range of from about 0.5 mm to about 50 mm or is in the range of from about 1 mm to about 5 mm.

The one or more swellable materials of the composite particles comprising proppant (and/or aggregated composite particles comprising proppant) may be capable of swelling to at least 500% of the volume of the completely unswelled, swellable material, such as to at least 1000% of the volume of the completely unswelled, swellable material. In some embodiments, the one or more swellable material of the composite particles comprising proppant (and/or aggregated composite particles comprising proppant) may be capable of swelling to at least 100% of the volume of the completely unswelled, swellable material, such as to at least 200% of the volume of the completely unswelled, swellable material. In some embodiments, the swellable material of the composite particles comprising proppant (and/or aggregated composite particles comprising proppant) may be capable of swelling to at least 10% of the volume of the completely unswelled, swellable material, such as to at least 20% of the volume of the completely unswelled, swellable material. The swelling capability or the degree of swelling may be dependent on the nature of the liquid, which the swelling material absorbs/incorporates during the swelling process. The swelling capability or the degree of swelling may also be dependent on the additive concentration in the liquid in which the swelling material swells. For example, there may be an effect of water dissoluble salts on the swelling properties of cross-linked polyelectrolyte salts, such as, for example, with the increasing salt concentration of water the degree of swelling of these said polyelectrolytes may decrease. In some embodiments, the swellable material may be capable of swelling to a swelled form that has low isothermal compressibility at the treating temperature and pressure, such as isothermal compressibility in the range of from about $0.0\ Pa^{-1}$ to about $5\times10^{-10}\ Pa^{-1}$, or in the range of from about $0.0\ Pa^{-1}$ to about $50\times10^{-10}\ Pa^{-1}$, or in the range of from about $0.0\ Pa^{-1}$ to about $500\times10^{-10}\ Pa^{-1}$. In some embodiments, the density of the swelled material should remain substantially constant for isothermal pressure changes, that is, the coefficient of isothermal compressibility for the swelled particulate may be low, such as isothermal compressibility in the range of from about $0.0\ Pa^{-1}$ to about $5\times10^{-10}\ Pa^{-1}$, or in the range of from about $0.0\ Pa^{-1}$ to about $50\times10^{-10}\ Pa^{-1}$, or in the range of from about $0.0\ Pa^{-1}$ to about $500\times10^{-10}\ Pa^{-1}$. In embodiments, the swellable material into which the one or more proppants are incorporated is capable of swelling upon contact with an agent for the swellable material, such as a treatment fluid. The agent for the swellable material may be any fluid or component that causes the swellable material to swell, such as via absorption of the treatment fluid. In some embodiments, the swelling may occur upon contact with an agent may include gas generation. For example, carbon dioxide may be generated from carbonates upon contact with an agent having a low pH, such as treatment fluid with an acidic pH; the produced gas may be contained as an inclusion within composite particle comprising proppant (and/or aggregated composite particles comprising proppant). Carbon dioxide generation may also occur (such as in a fluid containing sodium bicarbonate and citric acid) as the result of a chemical reaction between sodium bicarbonate and citric acid (the solid sodium bicarbonate and citric acid dissolve in the aqueous treatment fluid upon contact with the treatment fluid). In some embodiments, the swellable material may be "treatment fluid swellable," meaning that the agent is the treatment fluid, such as an aqueous treatment fluid. Suitable aqueous treatment fluids for use as the agent for the swellable material may include, for example, fresh water, brackish water, sea water, brine, and any combination thereof in any proportion.

In some embodiments, the swellable material may be "oil swellable," meaning that the agent for the swellable material is an organic fluid. Examples of organic fluids may include, for example, hydrocarbons, diesel, kerosene, crude oil, and any combination thereof in any proportion.

In some embodiments, the composite particles comprising proppant (and/or aggregated composite particles comprising proppant) may comprise a swellable material in a substantially unswelled form. As used herein, the term "substantially unswelled" means that the composite particles comprising proppant (and/or aggregated composite particles comprising proppant) are not swelled to more than 10% of their swelling capability. Such unswelled composite particles, (which comprise either proppant [and/or aggregated composite particles comprising proppant] incorporated into swellable material or composite particles comprising proppant [and/or aggregated composite particles comprising proppant] and swellable material incorporated into a third material, which can be highly viscous or cross-linked material or both) may be suitable for use in, for example, narrow fractures, because they can easily enter into the fractures due to their smaller composite particle size as compared to their larger composite particle/size (observed after or during swelling).

In the methods of the present disclosure composite particles comprising either proppant (and/or aggregated composite particles comprising proppant) containing swellable material in a substantially unswelled form or composite particles comprising proppant (and/or aggregated composite particles comprising proppant) and swellable material incorporated into a third material, which can be highly viscous or cross-linked material or both may pass through a perforation of a wellbore casing, such as within the fracture during the fracturing operation, or about 10% to about 100% of the composite particle comprising proppant (and/or aggregated composite particle comprising proppant) passes through the perforation of a wellbore casing while containing swellable material in a substantially unswelled form. After passing through the perforation of a wellbore casing, the swellable material of the composite particles comprising proppant (and/or aggregated composite particles comprising proppant) may turn into a "substantially swelled form." As used herein, the term "substantially swelled" means that the composite particles comprising proppant (and/or aggregated composite particles comprising proppant) are swelled to at least 30% of their swelling capability. In the methods of the present disclosure, the above described composite particles may be mixed with traditional (non-composite) proppant particle.

In some embodiments, the transition of the swellable material of the composite particles comprising proppant (and/or aggregated composite particles comprising proppant) from a substantially unswelled form to a substantially swelled form may be brought about by a swelling triggering event, such as, for example, by a pH change, a temperature change, a change in the ionic concentration (including formation of poly-electrolyte complexes), a change in hydrophobicity, and/or a change in the solvent composition.

In embodiments, the swellable material may be an organic material, such as a polymeric material, or a salt of the polyelectrolytes of these said polymeric materials, or any superabsorbent polymers, which could swell considerably with water intake. Examples of polymeric materials may include, for example, polyvinyl alcohol, polyvinyl alcohol copolymers, ethylene maleic anhydride copolymer, cross-linked polyacrylamide, cross-linked polyacrylate, cross-linked copolymers of acrylamide and acrylate monomers, starch grafted with acrylonitrile and acrylate, starch grafted copolymer of polyacrylonitrile, cross-linked polymers of two or more of allylsulfonate, 2-acrylamido-2-methyl-1-propanesulfonic acid, 3-allyloxy-2-hydroxy-1-propanesulfonic acid, acrylamide, acrylic acid monomers, cross-linked carboxymethylcellulose, cross-linked polyethylene oxide and any combinations thereof.

The methods of the present disclosure may be used, for example, to enhance or stimulate oil and gas production from a well. In some embodiments, the methods of the present disclosure may be used to enhance the permeability of a proppant pack or a proppant matrix formed within a fracture so that fluids from the subterranean formation may flow more freely to the wellbore. In some embodiments, the swellable material may be capable of being degraded. For example, the swellable material may be capable of being degraded such that after being degraded, the majority of the swellable material can flow with a fluid, as a fluid, or be dissolved in another fluid, out of the proppant pack or proppant matrix. As used herein, the term "proppant pack" means the proppant is in an unconsolidated form. The term "proppant matrix" as used herein means the proppant pack is consolidated. In some embodiments, the swellable material may be capable of being degraded to become soluble in water. In some embodiments, the swellable material may be capable of being degraded to become soluble in another dissolving fluid, such as oil. In some embodiments, the swellable material is capable of being expanded upon contact with the treatment fluid, whereas, the proppant is not capable of being expanded upon contact with the treatment fluid.

The proppant to be incorporated into the composite particle comprising proppant of the present disclosure may be any appropriate size to prop open the fracture and allow fluid to flow through the proppant pack, that is, in between and around the proppant making up the pack. In some embodiments, the proppant may be of a size in the range of from about 5 to about 100 U.S. Standard Mesh. In some embodiments, the proppant may have an average largest dimension ranging of from about 0.050 millimeters to about 0.5 millimeters. In some embodiments, the proppant may have an average largest dimension ranging of from about 0.050 millimeters to about 5 millimeters, or the proppant may have a largest dimension ranging of from about 0.5 millimeters to about 5 millimeters. In some embodiments, the proppant may have a size distribution range such that at least 90% of the proppant has a largest dimension in the range of from about 0.05 millimeters to about 5 millimeters.

In embodiments, the proppant to be incorporated into the composite particle comprising proppant of the present disclosure may be any solid particle. In some embodiments, the proppant to be incorporated into the composite particle comprising proppant of the present disclosure may be selected based on desired characteristics, such as size range, crush strength, coating, and insolubility.

In embodiments, the proppant to be incorporated into the composite particle comprising proppant of the present disclosure may have a sufficient compressive or crush resistance to prop the fracture open without being deformed or crushed by the closure stress of the fracture in the subterranean formation. In embodiments, the proppant to be incorporated into the composite particle comprising proppant of the present disclosure may not dissolve in treatment fluids commonly encountered in a well. Proppant materials may include silicon dioxide, sand, nut hulls, walnut shells, bauxites, sintered bauxites, glass, natural materials, plastic beads, particulate metals, drill cuttings, ceramic materials, and any combination thereof.

In some embodiments, the proppant (or a portion thereof) to be incorporated into the composite particle comprising proppant of the present disclosure can be coated and pre-cured with a resin (in addition to the swellable material such that the coated proppant is incorporated into the swellable material; in some embodiments, the coating resin of the may be different from the swellable material), such as a curable resin, for example, to improve proppant strength and surface characteristics, such as compatibility with the other materials of the particle and/or wettability. This resin may be placed on the proppant before the proppant is introduced into the swellable material. In some embodiments, the proppant (or a portion thereof) to be incorporated into the composite particle comprising proppant of the present disclosure can be coated with an uncured resin before being introduced into the swellable material. In some embodiments, the uncured resin may cure in the subterranean formation to form a "proppant matrix." Suitable curable resins for coating the proppants (before the proppants are added to the swellable material) include, for example, epoxies, furans, phenolics, furfuryl alcohols, and any combination thereof in any desired proportion.

In embodiments, the average number-concentration (i.e., total number of proppant particles in a large number of composite particles divided by the number of the said composite particles) of proppant in the composite particles comprising proppant (and/or aggregated composite particles comprising proppant) may be in the range of from about 0.1 particles per piece to about 500 particles per piece. In embodiment, the average concentration of proppant in the treatment fluid may be in the range of from about 0.5 particles per piece to about 50 particles per piece.

In embodiments, the treatment fluid used in the methods of the present disclosure comprises a proppant in the form of a composite particle comprising proppant and/or a solid particulate, which can be suspended in the fracturing fluid, carried downhole, and deposited in the fracture, such as, for example, as a "proppant pack." In some embodiments, the proppant pack props the fracture in an open condition while allowing fluid flow through either the permeability of the pack or the open channels within the pack, which may be referred to as heterogeneous proppant placement (HPP). In some embodiments, at least about 50% by weight of the proppant introduced into the fracture does not settle. In some embodiments, at least about 30% by weight of the proppant introduced into the fracture does not settle. In some embodiments, at least about 10% by weight of the proppant introduced into the fracture does not settle. In some embodiments, at least about 50% by weight of the proppant introduced into the fracture exhibits a reduced sedimentation rate as compared with the original proppant. In some embodiments, at least about 30% by weight of the proppant introduced into the fracture exhibits a reduced sedimentation rate as compared with the original proppant. In some embodiments, at least about 10% by weight of the proppant introduced into the fracture exhibits a reduced sedimentation rate as compared with the original proppant. In embodiments, a majority of a fracture, such as a vertical fracture, may be utilized as a higher conductivity flow path, which allows for a larger effective radius of the fracturing treatment than would have been achievable if extensive sedimentation occurs, such as at least about 30% of the fracture, such as a vertical fracture, is utilized as a higher conductivity flow path, or least about 10% of the fracture, such as a vertical fracture, is utilized as a higher conductivity flow path.

In embodiments, amounts of one or more low-density materials surrounding the one or more high-density proppants or attached to the one or more high-density proppants may be selected such that the sedimentation rate (including its direction) in a treatment fluid (with a respective density) can be manipulated. For example, in some embodiments, for a predetermined treatment fluid, where the treatment fluid comprises one or more high-density proppant surrounded by a lower density material (a "composite particle comprising proppant"), such as a lower density material that forms after the swellable material is activated to transition into a material that is less dense that the proppant, the amount and/or density of the low-density material may be selected to obtain a reduced sedimentation rate, such as a sedimentation rate in the range of from about 0.1 cm/sec to about 5 cm/sec. In some embodiments, the materials (for example, treatment fluids, proppant materials, and particle materials, such as composite particle comprising proppant materials) may be selected to obtain a sedimentation rate in the range of from about 0.0 cm/sec to about 0.1 cm/sec. In some embodiments, the materials (for example, treatment fluids, proppant materials, and particle materials, such as composite particle comprising proppant materials) may be selected to obtain a sedimentation rate in the range of from about 0.0 cm/sec to about −0.1 cm/sec (where the negative sedimentation rate represent creaming). In some embodiments, the materials (for example, treatment fluids, proppant materials, and particle materials, such as composite particle comprising proppant materials) may be selected to obtain a sedimentation rate in the range of from about −0.1 cm/sec to about −5 cm/sec (where the negative sedimentation rate represent creaming).

In some embodiments, the treatment fluid is introduced under conditions such that the composite particles comprising proppant (and/or aggregated composite particles comprising proppant) has swelled in volume at least 25% of its swelling capacity prior to the composite particles comprising proppant (and/or aggregated composite particles comprising proppant) reaching the portion of the subterranean formation to be treated. In some embodiments, the treatment fluid is introduced under conditions such that the composite particles comprising proppant (and/or aggregated composite particles comprising proppant) has swelled in volume to at least 75% of its swelling capacity prior to the composite particles comprising proppant (and/or aggregated composite particles comprising proppant) reaching the portion of the subterranean formation to be treated.

In some embodiments, the methods of the present disclosure include altering the properties of the composite particles comprising proppant, or the fluid, or both, for example, to eliminate or reduce sedimentation. For example, one or more of the following parameters of the particles comprising proppant may be altered to facilitate sedimentation rate decrease: decreasing the density of the particle entrained in the treatment fluid (such as decreasing the overall density of the particles comprising proppant relative to the density of the treatment fluid); increasing the hydrodynamic resistance of the particles comprising proppant, and/or increasing the density or viscosity of the fracturing fluid or fluid matrix in which the particles comprising proppant are delivered.

In embodiments, the methods of the present disclosure may comprise forming a proppant pack or proppant matrix in the fracture, such as a proppant pack or proppant matrix that provides a higher-permeability flow path for the oil or gas to reach the wellbore (compared to the permeability of the surrounding subterranean formation) and increases oil and gas production from the well.

In embodiments, the concentration of particles comprising proppant in the treatment fluid may be in the range of from about 0.001 kilograms to about 0.5 kilograms per liter of liquid phase. The concentration of proppant in the treatment fluid may be in the range of from about 0.02 kilograms to about 2.5 kilograms of proppant added per liter of liquid phase. In some embodiments, the proppant may have a much higher density than water, such as a specific gravity in the range of from about 1.01 to about 3.6, or in the range of from about 1.2 to about 2.6.

To suspend such a dense proppant in a treatment fluid (such as a fracturing fluid, or a water or water-based fracturing fluid), or reduce the rate of sedimentation in the treatment fluid the methods of the present disclosure incorporate the dense proppant into a particle ("composite particle comprising proppant"), such as a particle comprising a material that has a lower density than that of the proppant, or a swellable material that can be activated to transition into a material that is less dense that the proppant.

For example, in some embodiments, one or more particles of the high-density proppant may be surrounded by a low-density material, such as a low-density material that forms after the swellable material is activated by a swelling triggering event to transition into a material that is less dense than the proppant.

In some embodiments, a low-density material, such as a swelled low-density material that forms after the swellable material is activated by a swelling triggering event to transition into a material that is less dense than the proppant, of the composite particle comprising proppant and amounts thereof may be selected such that (upon expansion of the low-density material) the composite particle comprising proppant becomes buoyant in the treatment fluid (that is, the composite particle comprising proppant has a density that is less dense than that of the treatment fluid, such that it rises or floats in the treatment fluid). In some embodiments, the low-density material of the composite particle comprising proppant and amounts thereof may be selected such that expansion, such as by swelling, of the low-density material makes the composite particle comprising proppant have a buoyancy that is neutral relative to the density of the treatment fluid (that is, the composite particle comprising proppant has a density that is the same as that treatment fluid, such that it neither rises nor sinks in the treatment fluid).

In embodiments, the composite particle comprising proppant (and/or aggregated composite particle comprising proppant) of the present disclosure may be prepared on off-site and/or on-site.

Composite Particle Including a Plastic/Polymeric Swellable Material

Incorporating the one or more proppants into a composite particle comprising the above described low-density material can be achieved, for example, by forming a swellable material comprising a plastic/polymeric material on and/or around the one or more particulate proppants. In some embodiments, the low-density material may have an initial density (that is, before expansion, such as by swelling) that is higher than the density of the treatment fluid, such as a density in the range of from about 1.01 g/ml to about 1.5 g/ml, or in the range of from about 1.01 g/ml to about 1.2 g/ml. In some embodiments, the lower density material may have a density (that is, after expansion, such as by swelling) that is close to (or less dense than) the density of the treatment fluid, such as a density in the range of from about 0.7 g/ml to about 1.3 g/ml, or in the range of from about 0.85 g/ml to about 1.2 g/ml. In embodiments where multiple proppant particles are integrated in a single composite particle, the particle may also be referred to as an aggregated composite particle comprising proppant.

In some embodiments, the composite particle comprising proppant of the present disclosure may be formed by coating and/or covering one or more proppants with a material in the form of a high fluid content gel, such as a high fluid content gel with a fluid content in the range of from about 10 mass percent to about 99.99 mass percent, or in the range of from about 50 mass percent to about 99.5 mass percent, which may afford a composite particle comprising proppant (and/or aggregated composite particle comprising proppant) having a density in the range of from about 3 g/ml to about 1 g/ml, or in the range of from about 2 g/ml to about 1.1 g/ml. In such embodiments, the one or more proppants may form one or more inclusions in the high fluid content gel phase. The higher the fluid content of the gel, the closer is the density of the gel to that of the fluid. Any polymer or polyelectrolyte with swelling behavior may be used as the gel, such as, for example, guar or carboxymethylcellulose (CMC). Additionally, any desired type of proppant may be used.

In some embodiments, the fluid content of the gel coating and/or covering and/or attached to (the swellable material) the one or more proppants is initially low or negligible and the gel is in collapsed/non-swollen/dry state, such as a swellable material comprising a gel with a fluid content in the range of from about 0.01 mass percent to about 20 mass percent, or in the range of from about 0.1 mass percent to about 10 mass percent, or in the range of from about 0.1 mass percent to about 5 mass percent, which may afford a composite particle comprising proppant (and/or aggregated composite particle comprising proppant) having a density in the range of from about 3.5 g/ml to about 1.5 g/ml, or in the range of from about 2.7 g/ml to about 2 g/ml. In such embodiments, the radius of the composite particle comprising proppant (and/or aggregated composite particle comprising proppant) is close to the radius of the one particle or more proppant particle (that is, the radius of the envelope surface of the more proppant particles). Such composite particle comprising proppant (and/or aggregated composite particle comprising proppant) may be mixed with the treatment fluid, such as a fracturing fluid, such that the gel (swellable material) swells and takes up an amount of fluid, such as an amount in the range of from about 10% of its mass to about 30,000% of its mass, or in the range of from about 50% to about 5,000%, or in the range of from about 100% to about 500%. In some embodiments, the swelled-to-unswelled volume ratio of the particle (that is, the volume of the swelled composite particle comprising proppant (and/or aggregated composite particle comprising proppant) divided with the volume of the unswelled composite particle comprising proppant (and/or aggregated composite particle comprising proppant)) may be in the range of from about 1.1 to about 300, such as in the range of from about 1.5 to about 50, or in the range of from about 2 to about 5.

In some embodiments, the majority of the swelling that the swellable material experiences occurs after the composite particle comprising proppant (and/or aggregated composite particle comprising proppant) passes through a perforation of a wellbore casing, such as within the fracture during the fracturing operation. For example, at least about 50% of the swelling may occur after the composite particle comprising proppant (and/or aggregated composite particle comprising proppant) passes through a perforation of a wellbore casing, such as within the fracture during the fracturing operation. In some embodiments, about 30% to about 10% of the swelling occurs after the composite particle comprising proppant (and/or aggregated composite particle comprising proppant) passes through a perforation of a wellbore casing, such as within the fracture during the fracturing operation. In some embodiments, the swelling of the gel material (swellable material) of the composite particle comprising proppant (and/or aggregated composite particle comprising proppant) may be triggered by a swelling triggering event, such as, for example by either a chemical means (for example, pH, and/or salt concentration) or a physical means (for example, temperature or pressure change) at a preselected time during the fracturing process.

In embodiments, the final/ultimate size (after expansion, such via swelling) of the composite particle comprising proppant (and/or aggregated composite particle comprising proppant) may be any desired size based on the desired application. For example, the average final/ultimate size (as measured by the longest dimension after expansion, such via swelling) of the composite particles comprising proppant (and/or aggregated composite particle comprising proppant) may be in the range of from about 0.1 mm to about 50 mm, or in the range of from about 0.5 mm to about 5 mm.

In some embodiments, the minimum final/ultimate size (after expansion, such via swelling) of the composite particle comprising proppant (and/or aggregated composite particle comprising proppant) may be selected to be close to or larger than the fracture width of the fracture being treated, so the initial composite particle (before expansion) could fit in the fracture and then expand to the final/ultimate side after being introduced to the fracture. For example, the average minimum final/ultimate size (as measured by the longest dimension after expansion, such via swelling) of the composite particles comprising proppant (and/or aggregated composite particle comprising proppant) may be in the range of from about 0.2 mm to about, 2 mm or in the range of from about 0.5 mm to about 1 mm.

Composite Particle Including a Crosslinked Gel Swellable Material

In some embodiments, crosslinked gels may be viewed as a subclass of swellable materials that may have a higher swelling ratio and may not dissolve. The premature dissolution and potential degradation of the buoyancy effect may be observed for non-crosslinked swellable materials.

In some embodiments, the composite particle comprising proppant may be formed by coating and/or covering one or more proppants with a swellable material comprising crosslinked gels with low polymer content, such as a crosslinked gel with a polymer content in the range of from about 0.01 mass percent to about 50 mass percent, or in the range of from about 0.1 mass percent to about 5 mass percent, which may afford a composite particle comprising proppant (and/or aggregated composite particle comprising proppant) having a specific gravity in the range of from about 2.5 to about 1, or in the range of from about 1.5 to about 1.01. In some embodiments, these composite particles may be prepared with, for example, uncrosslinked gels such that the crosslinking occurs at the surface after the particles (such as particles containing steam) are mixed with a stream of treatment fluid (which may contain crosslinker. In some embodiments, crosslinking may occur either in the wellbore and/or subterranean formation.

In some embodiments, a mixture may be formed from proppant, uncrosslinked polymer (for instance guar), and particles capable of swelling. This mixture may be mixed, or co-injected with the treatment fluid. In some embodiments, crosslinking of the uncrosslinked polymer may occur after the triggering event, which can happen at the surface, in the wellbore and optionally in the formation. After crosslinking, the proppant and the particles capable of swelling are bounded together with the crosslinked polymer and form a composite particle (that is, the proppant, such as sand, and the swelling particles are trapped inside the cross-linked polymer. Such an event may occur, for example, in the treatment fluid, before and/or after being in the wellbore and/or anywhere else during the treatment operation. In such a composite particle, the particles capable of swelling and/or the crosslinked polymer may swell or activated to swell at any desired time upon exposure to a triggering event. In some embodiments, the introduction of particles capable of swelling may be used with a component that serves as a bounding agent, such as, for example, a guar material possessing a poor swelling capability that serves as a bounding agent between the proppant and the particles with high swelling capability. In such embodiments, the composite particle comprising proppant is coated and/or covered with or attached to a crosslinked gel in an amount in the range of from about 10 weight percent to about 10,000 weight percent, or in the range of from about 100 weight percent to about 5,000 weight percent with respect to proppant mass, which may afford a composite particle comprising proppant (and/or aggregated composite particle comprising proppant) having a specific gravity in the range of from about 2.5 to about 1, or in the range of from about 1.5 to about 1.01. In such embodiments, the one or more proppants form one or more inclusions in the gel phase.

In some embodiments, the swellable materials may include polymer materials with thermosensitive and swelling behavior, such as, for example, polyvinyl alcohol, poly (acrylamide-co-acrylic acid), and polyvinyl acetate. Polymer blends based on polyvinyl alcohol/polyethylene glycol, poly(vinyl alcohol)/collagen, polyvinyl alcohol/polyvinyl pyrrolidone, polyacrylic acid or its salts, and/or poly(acrylamide-co-acrylic acid) may also be used.

Composite Particle Including a Foamable-Swellable Material

In some embodiments, the density of the swellable material, such as a material with density that can be triggered to be lower than that of the proppant and/or treatment fluid, can be adjusted (that is, reduced) by forming solid foam with either close and/or open pore structure. For example, the composite particle comprising proppant of the present disclosure may be formed by coating and/or covering one or more proppants with, or attaching to a low density material that forms a solid foam with either a closed and/or open pore structure, such as a low density material with a density in the range of from about 2 $kg/m^3$ to about 1000 $kg/m^3$, or in the range of from about 20 $kg/m^3$ to about 100 $kg/m^3$, which may afford a composite particle comprising proppant (and/or aggregated composite particle comprising proppant) having a density in the range of from about 0.8 g/ml to about 2.5 g/ml, or in the range of from about 1 g/ml to about 1.5 g/ml. In such embodiments, the swellable material, such as a material with density that can be triggered to be lower than that of the proppant and/or treatment fluid, may be selected from a low-density hydrocarbon, and/or a polymer.

In some embodiments, when an open pore structure is formed in the composite particle comprising proppant (and/or aggregated composite particle comprising proppant), the gas in the pores may be dissolved in the treatment fluid, such as a fracturing fluid, during the treatment operation. In such embodiments, the density of the low-density material of the composite particles comprising proppant (and/or aggregated composite particle comprising proppant) may be time dependent. For example, because the solubility of gases in liquid is pressure and temperature dependent, the rate at which the gas is dissolved may be adjusted by manipulating the pressure and temperature during the treatment operation. In some embodiments, the gas in the open pores of the composite particles comprising proppant (and/or aggregated composite particle comprising proppant) may be dissolved into the treatment fluid in a time in the range of from about 0.01 hour to about 10 hours, or in the range of from about 0.1 hour to about 5 hours.

In some embodiments, a closed pore structure may be formed in the composite particle comprising proppant (and/or aggregated composite particle comprising proppant). In such embodiments, the gas in the closed pores may not readily dissolve in the treatment fluid, such as a fracturing fluid, during the treatment operation.

In embodiments in which a composite particle comprising proppant (and/or aggregated composite particle comprising proppant) including a solid foam is prepared on site, a suitable on-site preparation may be based on the production of "pop-corn" type composite particle comprising proppant (and/or aggregated composite particle comprising proppant). This popped composite particle comprising proppant producing approach may include generating composite particle comprising proppant by exposing one or more proppants coated and/or covered with a polymeric particle to a heating operation in which the temperature is high enough that gases are generated which expand the polymeric portion of the composite particle comprising proppant. In such embodiments, the proppant may be a thermally insensitive proppant, such as a silicate-based proppant. Any suitable polymer material that generates gasses upon heating may be used. In some embodiments, the polymer material may be formed from a multicomponent mixture and it can contain non-polymeric additives. Such additives may be distributed in the polymeric material either homogeneously or in the form of inclusions.

In some embodiments, the composite particle comprising proppant (and/or aggregated composite particle comprising proppant) may be prepared by preparing either a suspension of proppant (or filler), or a mixed suspension of proppant and swellable material, such as a swellable material having a lower density than the proppant. In some embodiments, the medium of such suspension may contain, in addition to solvent, monomer(s), oligomer(s), or polymer(s), which may be crosslinked to form a swellable material comprising a crosslinked gel phase. In some embodiments, such compounds may be added to the medium after suspension formation. In embodiments, the swellable material comprising a crosslinked gel phase may be prepared such that its volume can swell by a factor in the range of from about 2 to about 300, such as in the range of from about 2 to about 200, or in the range of from about 2 to about 20, when the swellable material comprising a crosslinked gel phase is contacted with the treatment fluid, such as a fracturing fluid.

Preparing Dried Swellable Materials via a Suspension

In some embodiments, preparing a swellable material, such as a swellable material having a lower density than the proppant, for use in the composite particle comprising proppant (and/or aggregated composite particle comprising proppant) of the present disclosure may include preparing a non-crosslinked polymer solution; such polymer solution may contain some partially dissolved non-crosslinked polymer species in the form a suspension. In some embodiments, the polymer solution may comprise either a non-crosslinked or crosslinked superabsorbent polymer (SAP), such as poly (acrylamide-co-acrylic acid). The suspension may then be injected into a blender where a crosslinker may be added. In some embodiments, the crosslinker may be added in the form of a continuous stream and homogenized with the suspension. In some embodiments, additional lightweight particulates, such as lightweight particulates with a specific gravity in the range of from about 2.65 to about 0.4, or in the range of from about 2.3 to about 0.7, may be included in the lower density material, so as to reduce the density of the above described composite particles comprising proppant (and/or aggregated composite particles comprising proppant). Suitable lightweight particulates may include, for example, hollow spheres, polymers, wood, rubber, ash, and fibers, with a specific gravity in the range of from about 2.65 to about 0.4, or in the range of from about 2.3 to about 0.7. In some embodiments, the treatment fluids used in the methods of the present disclosure may contain the additional lightweight particulates in amounts of from about 1% with respect to proppant mass % to about 500% with respect to proppant mass %, or in amounts of from about 10% to about 200% with respect to proppant mass, or in amounts of from about 20% to about 100% with respect to proppant mass. In some embodiments, the dried particles may be generated by one of the following methodologies: (i) cutting the solvent containing and crosslinked phase (containing the proppant, superabsorbent particles, and not fully dissolved non-crosslinked polymer species), into pieces and drying; (ii) drying the solvent containing crosslinked phase, (containing the proppant, superabsorbent particles, and partially dissolved non-crosslinked polymer species) and grinding. In some embodiments, the average particle size of these dried particles may range from about 0.2 mm to about 6 mm, or from about 0.5 mm to about 3 mm.

In some embodiments, a set crosslinked gels of a predetermined size may be formed by pushing the crosslinked gel through a cutting apparatus to generate a desired shape of crosslinked gels. In some embodiments, the crosslinked gel may be pushed through the cutting apparatus continuously. In some embodiments, the cutting apparatus may be a cutting mesh that generates a set of crosslinked gel components with any desired diameter, such as a diameter in the range of from about 0.1 mm to about 10 mm, or in the range of from about 0.5 mm to about 5 mm. In such embodiments, a rotating blade may be situated in front of an output side of the cutting mesh and may slice the cylinders into crosslinked gel pieces having any predetermined desired length, such as a length in the range of from about 1 mm to about 10 mm, or in the range of from about 2 mm to about 5 mm. In some embodiments, these crosslinked gel pieces (swellable materials) may be dried and then bounded to the surface of proppant particles by an adhesive and/or sticky material, such as glue, or a polymerized layer to form composite particles comprising proppant (and/or aggregated composite particles comprising proppant).

The composite particles comprising proppant (and/or aggregated composite particles comprising proppant) including dried swellable materials may be mixed with the treatment fluid, such as at the wellhead, and this mixture is injected into the well. In such embodiments, the swellable materials (that is, the dry gel pieces) may swell in the treatment fluid during pumping (and/or fracturing) and may reach their final/ultimate size within the fracture. Inclusion of the lightweight particulates in the swellable materials may further decrease the overall density of the composite particles comprising proppant (and/or aggregated composite particles comprising proppant) to a desired value, such as a density in the range of from about 1 g/cc to about 2 g/cc, or in the range of from about 1.2 g/cc to about 1.5 g/cc, in order to more effectively transport the composite particles comprising proppant (and/or aggregated composite particles comprising proppant) to a subterranean fracture, such as by a fracturing carrier fluid.

Preparing Composite Particles Comprising Proppant via a Suspension

In some embodiments, a swellable material comprising a crosslinked gel phase may be prepared by forming an aqueous linear polymer solution that is mixed with one or more proppants to form a suspension. This suspension may then be injected into a blender where a crosslinker may be added, for example, at a crosslinker concentration in the range of from about 1% to about 30%, or in the range of from about 5% to about 10%. In some embodiments, the crosslinker may be added in the form of a continuous stream and homogenized with the suspension. In some embodiments, a set of composite particle comprising proppant (and/or aggregated composite particle comprising proppant) of a predetermined size may be formed from this crosslinked gel comprising one or more proppants by pushing the crosslinked gel comprising one or more proppants through a cutting apparatus to generate any desired shape of composite particle comprising proppant (and/or aggregated composite particle comprising proppant). In some embodiments, the crosslinked gel comprising one or more proppants may be pushed through the cutting apparatus continuously.

In some embodiments, the cutting apparatus may be a cutting mesh that generates a desired shape, such as a set of cylinders or triangular/rectangular/pentagonal/hexagonal/octagonal prisms with any desired diameter (for the cylinder) or maximum cross sectional dimension (for the prisms), such as a diameter or maximum cross sectional dimension in the range of from about 0.1 mm to about 10 mm, or in the range of from about 0.5 mm to about 5 mm. In such embodiments, a rotating blade situated in front of an output side of the cutting mesh may slice the cylinders/prisms into composite particles comprising proppant (and/or aggregated composite particles comprising proppant) having any desired length, such as a length in the range of from about 1 mm to about 10 mm, or in the range of from about 2 mm to about 5 mm. These composite particles comprising proppant (and/or aggregated composite particles comprising proppant) may be mixed with the treatment fluid, such as a fracturing fluid (such as slickwater), and injected into a wellbore. In embodiments, when the composite particles comprising proppant (and/or aggregated composite particles comprising proppant) are mixed with the treatment fluid, such as a slickwater fracturing fluid, swelling may occur. For example, volume of the composite particles comprising proppant (and/or aggregated composite particles comprising proppant) may swell by a factor in the range of from about 2 to about 300, such as in the range of from about 2 to about 200, or in the range of from about 2 to about 20, when the swellable material comprising a crosslinked gel phase is contacted with the treatment fluid, such as a fracturing fluid when the composite particles comprising proppant (and/or aggregated composite particles comprising proppant) is contacted with the treatment fluid, such as a fracturing fluid.

In some embodiments, the cutting apparatus may be omitted and the suspension comprising the above described non-crosslinked material including one or more proppants may be injected into a stirred container containing a treatment fluid, such as a fracturing fluid, with high linear velocity, such as a linear velocity in the range of from about 0.01 m/s to about 100 m/s, or in the range of from about 0.1 m/s to about 10 m/s, via a small cross section nozzle or nozzles, such as a nozzle with a cross section diameter in the range of from about 0.1 mm to about 10 mm, or in the range of from about 0.2 mm to about 5 mm. The treatment fluid in the container may contain a high concentration of crosslinker solution, such as a crosslinker concentration in the range of from about 1% to about 30%, or in the range of from about 5% to about 10%. In some embodiments, the a stirring rate may be in the range of from about 1000 RPM to about 8000 RPM, or in the range of from about 2000 RPM to about 4000 RPM.

The turbulent flow in the stirred container, near the nozzle orifice, generates small drops from the polymer containing suspension. These droplets may be crosslinked by the crosslinker. Because the crosslinker may not homogenized within the drop, the outcome of this step may be interfacially crosslinked drops. In some embodiments, co-injection of the crosslinker containing treatment fluid and the suspension comprising the above described non-crosslinked material including one or more proppants may also be performed via one or more small cross section nozzle or nozzles, such as a nozzle with a cross section diameter in the range of from about 0.2 mm to about 5 mm.

In some embodiments, the composite particle comprising proppant (and/or aggregated composite particle comprising proppant) may be prepared via an emulsion process, such as a water-in-oil emulsion polymerization process, in which hydrophilic proppant particles may be included in aqueous emulsion droplets.

For example, incorporation of one or more proppants into a swellable material, such as a polymer can be carried out by dispersing the one or more proppants in a solution of the swellable material in an organic solvent, then dispersing this in an aqueous phase to form an emulsion from which the organic solvent is made to evaporate. In some embodiments, such a process allows the size of composite particle comprising proppant (and/or aggregated composite particle comprising proppant) to be controlled, with a narrow particle size distribution and with good repeatability from batch to batch.

For example, composite particle comprising proppant (and/or aggregated composite particle comprising proppant) produced by such a process may have a very narrow particle size distribution or grain size distribution (GSD) with a GSD of about 0.5 mm to about 1 mm, or less than about 2 mm. The above grain size distribution (GSD) is obtained by observing the cross-section of the composite particle comprising proppant (and/or aggregated composite particle comprising proppant) by a scanning electron microscope (SEM), measuring the primary particle size or aggregation size for 100 composite particle comprising proppant (and/or aggregated composite particle comprising proppant), and using the following formula:

$$\text{Grain size distribution (GSD)} = \text{GSD} = (D_{84p}/D_{16p})^{0.5}$$

where $D_{16p}$ is a particle size at which a cumulation number becomes 16% and $D_{84p}$ is a particle size at which a cumulation becomes 84%, when a number cumulative distribution is drawn from smaller sizes for the particle size of the particles.

In some embodiments, one or more proppants (such as proppants with a hydrophobic surface and/or proppants functionalized to have a hydrophobic surface) dispersible in organic solvent, can be incorporated within a swellable material, such as a polymer, using a technique including (i) dispersing/dissolving the one or more proppants and swellable material, such as a polymer, in a water-immiscible organic solvent, (ii) dispersing the resulting solution in an aqueous phase, which may or may not contain a crosslinking agent for the polymer and which may or may not contain a emulsifying agent, to form an oil-in-water emulsion in which the dispersed phase is the solution formed in step (i), (iii) stirring or otherwise agitating that emulsion while causing or allowing evaporation of the organic solvent and some of the water (and optionally waiting for the completion of the crosslinking process), thereby forming composite particle comprising proppant (and/or aggregated composite particle comprising proppant) in which the one or more proppants are distributed within the swellable material, such as a polymer, which may or may not be crosslinked.

In some embodiments, one or more proppants can be incorporated into an swellable material in an analogous way by (i) dispersing/dissolving the swellable material, such as a polymer in aqueous solvent, (ii) suspending the one or more proppants, which may be selected to be naturally hydrophilic in the aqueous solvent solution of swellable polymer, (iii) dispersing the resulting suspension in an organic solvent, which such as an organic solvent that is not fully miscible with the aqueous solvent and may or may not contain a crosslinking agent for the polymer (and may optionally contain a emulsifying agent), to form an water-in-oil emulsion in which the disperse phase is droplets of the aqueous solvent with the one or more proppants within these droplets, and (iv) stirring or otherwise agitating that emulsion while causing or allowing evaporation of both the organic solvent and the water (and optionally waiting for the completion of the crosslinking process), thereby forming composite particle comprising proppant (and/or aggregated composite particle comprising proppant) in which the one or more proppants are distributed within the swellable material, such as a polymer, which may optionally be crosslinked.

In each of these emulsion procedures the composite particle comprising proppant (and/or aggregated composite particle comprising proppant) particle size may be affected by the choice of the swellable material, the initial concentration of the swellable material, the type and concentration of the emulsifying agent, the concentration of the crosslinker in the continuous phase of the emulsion, the stirring rate, and the organic-to-aqueous phase ratio. In some embodiments, a higher viscosity of this disperse phase leads to larger disperse droplets which in turn leads to larger composite particle comprising proppant (and/or aggregated composite particle comprising proppant), such as composite particles comprising proppant (and/or aggregated composite particle comprising proppant) having an average largest dimension ranging of from about 5 mm to about 50 mm. In some embodiments, the proppant may have a largest dimension ranging of from about 0.05 mm to about 5 mm. For any chosen composition, the droplet size of the disperse phase and hence the size of the particles can be controlled through the amount of shear applied to stir or agitate the emulsion while solvent evaporates, such that composite particles comprising proppant (and/or aggregated composite particle comprising proppant) having an average largest dimension ranging of from about 5 mm to about 50 mm, may be produced, or a largest dimension ranging of from about 0.05 mm to about 5 mm.

After the crosslinking, the oil and water solvents are removed and the dry gel particles, in which the proppant particles are inclusions, are recovered. These dry composite particles comprising proppant (and/or aggregated composite particle comprising proppant) having an average largest dimension ranging of from about 0.05 mm to about 5 mm, or the proppant may have a largest dimension ranging of from about 0.2 mm to about 5 mm may be mixed with a treatment fluid, such as slickwater, at the wellhead and pumped. In some embodiments, as soon as these such as composite particles comprising proppant (and/or aggregated composite particle comprising proppant come to contact with the slickwater the swelling process starts.

The concentration of composite particles comprising proppant (and/or aggregated composite particles comprising proppant) in the treatment fluid may be in the range of from about 4 kilograms to about 0.02 kilograms per liter of treatment fluid (34 lb/gal-0.17 lb/gal). The concentration of proppant in the treatment fluid may be in the range of from about 4 kilograms to about 0.02 kilograms of proppant added per liter of treatment fluid (34 lb/gal-0.17 lb/gal). In such embodiments, the proppant may have a specific gravity in the range of from about 5 to about 1, or in the range of from about 3.7 to about 2.4.

In some embodiments, the ratio for the weight of the swellable material to the proppant in the fully swelled state of the swellable material may be in the range from about 0.1 to about 100, or from about 0.5 to about 10.

In the above embodiments, additional lightweight particulates, such as lightweight particulates with a specific gravity in the range of from about 2.65 to about 0.4, or in the range of from about 2.3 to about 0.7, may be included in the swellable material having lower density than that of the proppant of the above described composite particles comprising proppant (and/or aggregated composite particles comprising proppant). Suitable lightweight particulates may include, for example, hollow spheres, polymers, wood, rubber, ash, and fibers, with a specific gravity in the range of from about 2.65 to about 0.4, or in the range of from about 2.3 to about 0.7. Inclusion of such lightweight particulates may further decrease the overall density of the composite particles comprising proppant (and/or aggregated composite particles comprising proppant) to a desired value, such as a density in the range of from about 0.7 g/ml to about 2.0 g/ml, or in the range of from about 0.9 g/ml to about 1.3 g/ml, in order to more effectively transport the composite particles comprising proppant (and/or aggregated composite particles comprising proppant) to subterranean fracture by fracturing carrier fluid. In such embodiments, the treatment fluids used in the methods of the present disclosure may contain the additional lightweight particulates in amounts of from about 400% to about 0.01% by weight of the treatment fluid, or in amounts of from about 100% to about 0.1% by weight of the treatment fluid, and in amounts of from about 20% to about 0.1% by weight of the treatment fluid.

In some embodiments, a gas, such as nitrogen, carbon dioxide, and/or air, and/or a hydrocarbon, such as oil, diesel, palm oil, and vegetable oil, or other low density fluid (or low density slurry) with a specific gravity in the range of from about 2.00 to about 0.4, or in the range of from about 1.2 to about 0.7, may be included in the lower density material of the above described composite particles comprising proppant (and/or aggregated composite particles comprising proppant), so as to reduce the density of the above described composite particles comprising proppant (and/or aggregated composite particles comprising proppant). In such embodiments, the treatment fluids used in the methods of the present disclosure may contain the gas, such as nitrogen, carbon dioxide, and/or air, and/or a hydrocarbon, such as oil, diesel, palm oil, and vegetable oil, or other low density fluid, in amounts of from about 400% to about 0.01% by weight of the treatment fluid, or in amounts of from about 100% to about 0.1% by weight of the treatment fluid, and in amounts of from about 20% to about 0.1% by weight of the treatment fluid.

Optionally, one or more other additives can be included to form a treatment fluid to be delivered into a wellbore for various purposes. For example, the treatment fluids used in the methods of the present disclosure may include a "breaker." A breaker is a chemical used for the purpose of diminishing or "breaking" the viscosity of a treatment fluid such that the fluid can be recovered more easily from the formation. With regard to breaking down viscosity, oxidizers, enzymes, or acids may be used, including delayed-release or encapsulated breakers. Breakers may reduce the molecular weight of one or more polymers in the treatment fluid (which may be cross-linked) by the action of an acid, an oxidizer, an enzyme, or a combination of these.

For example, in embodiments where borate-crosslinked gels are used, increasing the pH, and, therefore, increasing the effective concentration of the active cross-linker, the borate anion, reversibly creates the borate cross-links. Lowering the pH may eliminate the borate/polymer bonds. At a high pH above 8, the borate ion exists and is available to cross-link and cause gelling. At a lower pH, the borate is tied up by hydrogen and is not available for cross-linking.

The treatment fluids used in the methods of the present disclosure may also include a surfactant. For example, a surfactant may be used for its ability to aid the dispersion and/or stabilization of a gas component into the fluid. Viscoelastic surfactants are also suitable for use in the treatment fluids of the present disclosure.

Treatment fluids used in the present disclosure can further contain other additives and chemicals that are known to be commonly used in oil field applications by those skilled in the art. These include, for example, breaker aids, co-surfactants, oxygen scavengers, alcohols, scale inhibitors, corrosion inhibitors, fluid-loss additives, oxidizers, bactericides, biocides, and the like.

It should be understood that during the course of a treatment, several different treatment fluids may be used. Some common reasons why treatment fluids of a treatment operation would be varied over the course of a treatment include to accommodate: changes in the concentrations of proppant desired to be carried down to the subterranean formation from initial packing of the fracture to tail-end packing; expected changes in temperature; or the longer duration that the first treatment fluid may be desired to maintain viscosity before breaking compared to the shorter duration that a later-introduced treatment fluid may be desired to maintain viscosity. These changes may be made in stepped changes of concentrations or gradient changes of concentrations. Additionally, certain components of the treatment fluids may be changed, as desired.

In some embodiments, the methods of the present disclosure further comprise creating or extending at least one fracture in the subterranean formation, such as prior to introducing the treatment fluid comprising composite particles comprising proppant (and/or aggregated composite particles comprising proppant). In some embodiments, the size distribution range of the composite particles comprising proppant (and/or aggregated composite particles comprising proppant) is selected such that at least a portion of the composite particles comprising proppant (and/or aggregated composite particles comprising proppant) when in a substantially swelled form would be able to enter the fracture.

In some embodiments, the treatment fluid is pumped into the subterranean formation at a sufficient velocity to help maintain presence of the composite particles comprising proppant (and/or aggregated composite particles comprising proppant) in the fluid at least until the treatment fluid is placed into a fracture in the subterranean formation.

As discussed above, the treatment fluid carrying the composite particles comprising proppant (and/or aggregated composite particles comprising proppant) may be any well treatment fluid, such as a fluid loss control pill, a water control treatment fluid, a scale inhibition treatment fluid, a fracturing fluid, a gravel packing fluid, a drilling fluid, and a drill-in fluid. The solvent (or carrier solvent) for the treatment fluid may be a pure solvent or a mixture. Suitable solvents or use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to suspend the composite particles comprising proppant (and/or aggregated composite particles comprising proppant) and/or dissolve or suspend the various other components of the treatment fluid.

Suitable organic solvents may include, for example, alcohols, glycols, esters, ketones, nitrites, amides, amines, cyclic ethers, glycol ethers, acetone, acetonitrile, 1-butanol, 2-butanol, 2-butanone, t-butyl alcohol, cyclohexane, diethyl ether, diethylene glycol, diethylene glycol dimethyl ether, 1,2-dimethoxy-ethane (DME), dimethylether, dibutylether, dimethyl sulfoxide (DMSO), dioxane, ethanol, ethyl acetate, ethylene glycol, glycerin, heptanes, hexamethylphosphorous triamide (HMPT), hexane, methanol, methyl t-butyl ether (MTBE), N-methyl-2-pyrrolidinone (NMP), nitromethane, pentane, petroleum ether (ligroine), 1-propanol, 2-propanol, pyridine, tetrahydrofuran (THF), toluene, triethyl amine, o-xylene, m-xylene, p-xylene, ethylene glycol monobutyl ether, polyglycol ethers, pyrrolidones, N-(alkyl or cycloalkyl)-2-pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, alkylene carbonates, alkyl carbonates, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, dibutyl carbonate, lactones, nitromethane, nitrobenzene sulfones, tetrahydrofuran, dioxane, dioxolane, methyltetrahydrofuran, dimethylsulfone, tetramethylene sulfone, diesel oil, kerosene, paraffinic oil, crude oil, liquefied petroleum gas (LPG), mineral oil, biodiesel, vegetable oil, animal oil, aromatic petroleum cuts, terpenes, mixtures thereof.

In embodiments, the composite particles comprising proppant (and/or aggregated composite particles comprising proppant) carried by the treatment fluid may remain in the fracture created, thus propping open the fracture when the fracturing pressure is released and the well is put into production.

In some embodiments, the treatment fluid comprising the composite particles comprising proppant (and/or aggregated composite particles comprising proppant) may have any suitable viscosity, such as a viscosity of from about 1 cP to about 1,000 cP (or from about 10 cP to about 100 cP) at the treating temperature, which may range from a surface temperature to a bottom-hole static (reservoir) temperature, such as from about −40° C. to about 150° C., or from about 10° C. to about 120° C., or from about 25° C. to about 100° C., and any effective shear rate may be used during the application of the shear event; in some embodiments, the shear rate that is observed during the application of a shear event to the above-mentioned fluid may be in a range of from about 1 $s^{-1}$ to about 100,000 $s^{-1}$, such as a shear rate in a range of from about 100 $s^{-1}$ to about 10,000 $s^{-1}$, or a shear rate in a range of from about 500 $s^{-1}$ to about 5,000 $s^{-1}$ as measured by common methods.

While the treatment fluids of the present disclosure are described herein as comprising the above-mentioned components, it should be understood that the treatment fluids of the present disclosure may optionally comprise other chemically different materials. In embodiments, the treatment fluid may further comprise stabilizing agents, surfactants, diverting agents, or other additives. Additionally, a treatment fluid may comprise a mixture of various crosslinking agents, and/or other additives, such as fibers or fillers, provided that the other components chosen for the mixture are compatible with the intended use of the treatment fluid. Furthermore, the treatment fluid may comprise buffers, pH control agents, and various other additives added to promote the stability or the functionality of the treatment fluid. The treatment fluid may be based on an aqueous or non-aqueous solution. The components of the treatment fluid may be selected such that they may or may not react with the subterranean formation that is to be treated.

In this regard, the treatment fluid may include components independently selected from any solids, liquids, gases, and combinations thereof, such as slurries, gas-saturated or non-gas-saturated liquids, mixtures of two or more miscible or immiscible liquids, and the like, as long as such additional components allow for the swelling of the composite particles comprising proppant (and/or aggregated composite particles comprising proppant) upon exposure to the swelling triggering event. For example, the treatment fluid may comprise organic chemicals, inorganic chemicals, and any combinations thereof. Organic chemicals may be monomeric, oligomeric, polymeric, crosslinked, and combinations, while polymers may be thermoplastic, thermosetting, moisture setting, elastomeric, and the like. Inorganic chemicals may be inorganic acids and inorganic bases, metals, metallic ions, alkaline and alkaline earth chemicals, minerals, salts and the like.

Various fibrous materials may be included in the treatment fluid. Suitable fibrous materials may be woven or nonwoven, and may be comprised of organic fibers, inorganic fibers, mixtures thereof and combinations thereof.

The methods of the present disclosure may also be combined with methods of using fibers to assist in the transport of proppant, for example in slickwater treatments, for example, as described in U.S. Pat. No. 7,275,596, the disclosure of which is hereby incorporated by reference in its entirety.

In embodiments, the treatment fluid may be driven into a wellbore by a pumping system that pumps one or more treatment fluids into the wellbore. The pumping systems may include mixing or combining devices, wherein various components, such as fluids, solids, and/or gases maybe mixed or combined prior to being pumped into the wellbore. The mixing or combining device may be controlled in a number of ways, including, but not limited to, using data obtained either downhole from the wellbore, surface data, or some combination thereof.

Fracturing a subterranean formation may include introducing hundreds of thousands of gallons of fracturing fluid into the wellbore. In some embodiments a frac pump may be used for hydraulic fracturing. A frac pump is a high-pressure, high-volume pump, such as a positive-displacement reciprocating pump. In embodiments, a treatment fluid comprising the composite particles comprising proppant (and/or aggregated composite particles comprising proppant) may be introduced by using a frac pump, such that the fracturing fluid may be pumped down into the wellbore at high rates and pressures, for example, at a flow rate in excess of about 20 barrels per minute (about 4,200 U.S. gallons per minute) at a pressure in excess of about 2,500 pounds per square inch ("psi"). In some embodiments, the pump rate and pressure of the fracturing fluid may be even higher, for example, at flow rates in excess of about 100 barrels per minute and pressures in excess of about 10,000 psi may be used.

The foregoing is further illustrated by reference to the following examples, which are presented for purposes of illustration and are not intended to limit the scope of the present disclosure.

EXAMPLES

Example Groups 1-4

A CMC-solution/sand mixture was prepared by stirring CMC (carboxymethylcellulose, Na-CMC-700, in the form of fibrous flakes, Biyasintes) with water for 15 minutes in an overhead blender, then sand was added, which was followed by 5 minutes of stirring. In this example, CMC was used as polymer material, $AlCl_3 \cdot 6H_2O$ as a cross-linker, and badger mesh 50/140 sand was used as proppant. An aqueous $AlCl_3$ solution was added to the mixture, followed by 5 minutes of stirring. A series of samples were prepared in the same manner. The concentrations of CMC and $AlCl_3 \cdot 6H_2O$ water solutions, and the amount of the added $AlCl_3$ solution are presented in the Table 1 below. Badger 50/140 sand was used as material embedded in polymeric matrix. The product of each of the above-described samples was a tight gel (the gel pieces were not visible deformed by the force of gravity when they were removed from the liquid and placed on flat and horizontal solid support).

TABLE 1

Components used in the homogeneously crosslinked CMC/sand mixture in the laboratory.

| Example group # | CMC conc., weight percent (wt. %) | Sand concentration wt. % | $AlCl_3 \cdot 6H_2O$ conc., wt. % | Volume of $AlCl_3$ (ml) injected into 100 ml CMC solution |
|---|---|---|---|---|
| 1 | 2 | 1 | 2 | 2, 4, 6, 8 |
| 2 | 4 | 2 | 2, 4 | 2, 4, 6, 8 |
| 3 | 5 | 2.5 | 2, 4 | 2, 4, 6, 8 |
| 4 | 10 | 5 | 2, 4 | 2, 4, 6, 8, 10, 12, 14, 16, 20 |

The swelling properties of homogenously crosslinked CMC/sand particles depend on the electrolyte content of the water. As shown in FIG. 1, the CMC/sand particles have different swelling rate in tap water and in 2 weight % aqueous KCl solution. In FIG. 1, results are presented for Example group #4 with 4 wt % $AlCl_3 \cdot 6H_2O$ concentration and 20 ml $AlCl_3$ injected into 100 ml CMC solution. The swelling ratio is calculated by using the following formula:

$$\Delta m = \frac{m_t - m_1}{m_1} \cdot 100$$

where $\Delta m$ is the weight increase in %, $m_1$ is the weight of the particle prior to interacting with the aqueous solution, and $m_t$ is the weight measured at a selected time set forth in FIG. 1.

Example Group 5

Figure 2A:
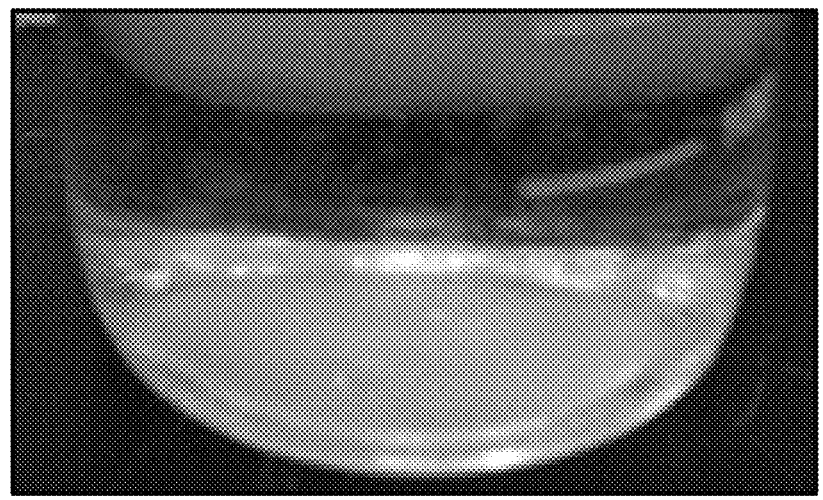
FIGS. 2A and 2B are photographs depicting the effects of CMC-concentration, $AlCl_3$-concentration, and stirring rate with respect to particle size.
Figure 2B:
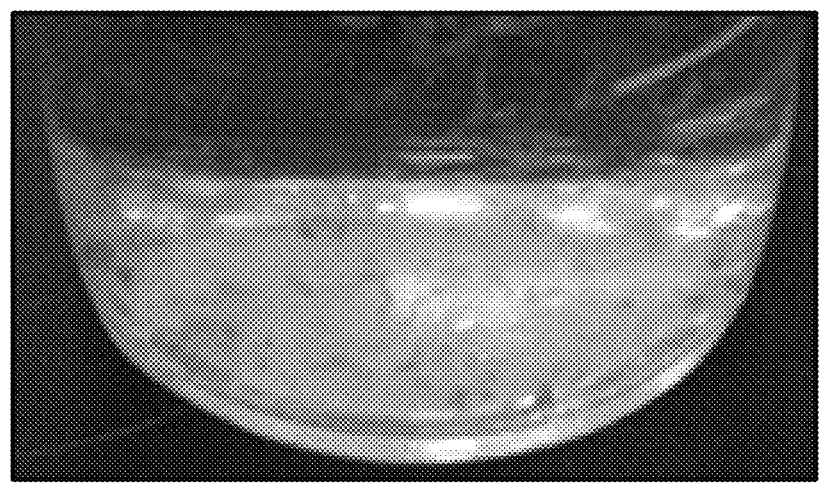
Figure 3A:
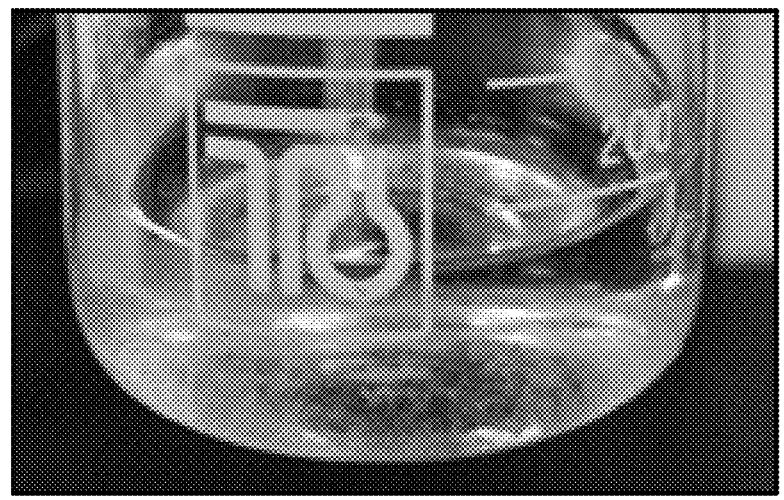
FIGS. 3A and 3B are photographs depicting the effects of CMC-concentration, $AlCl_3$-concentration, and stirring rate with respect to particle size.
Figure 3B:

This preparation is different from the above example groups in that a 2 milliliter CMC/sand mixture with a CMC concentration of 2 or 4 weight percent was injected into 200 ml aqueous AlCl$_3$ solution. The concentration of this latter solution was either 5, 10, or 20 weight percent. The cross-linking took place during stirring in an overhead mixer at the high rate (2000-4000 rpm). The effects of CMC-, AlCl$_3$-concentration, and stirring rate were studied. The results obtained indicate that the particle size depends on the stirring rate. The higher the stirring rate the smaller the particle size (See FIG. 2A: high stirring rate; and FIG. 2B: medium stirring rate (1000-2000 rpm); 2% CMC-gel, 5 wt % AlCl$_3$). At a high stirring rate particles of less than 1 mm (diameter, largest dimension) were produced, while at medium stirring rate particles of about 5 mm (diameter, largest dimension) were produced. Similar results were obtained for the experiments conducted at a 5% to 10% gel concentrations (See FIG. 3A: high stirring rate; and FIG. 3B: medium stirring rate; 2% wt % CMC-gel, 10 wt % AlCl$_3$)

Example 6

Figure 4:
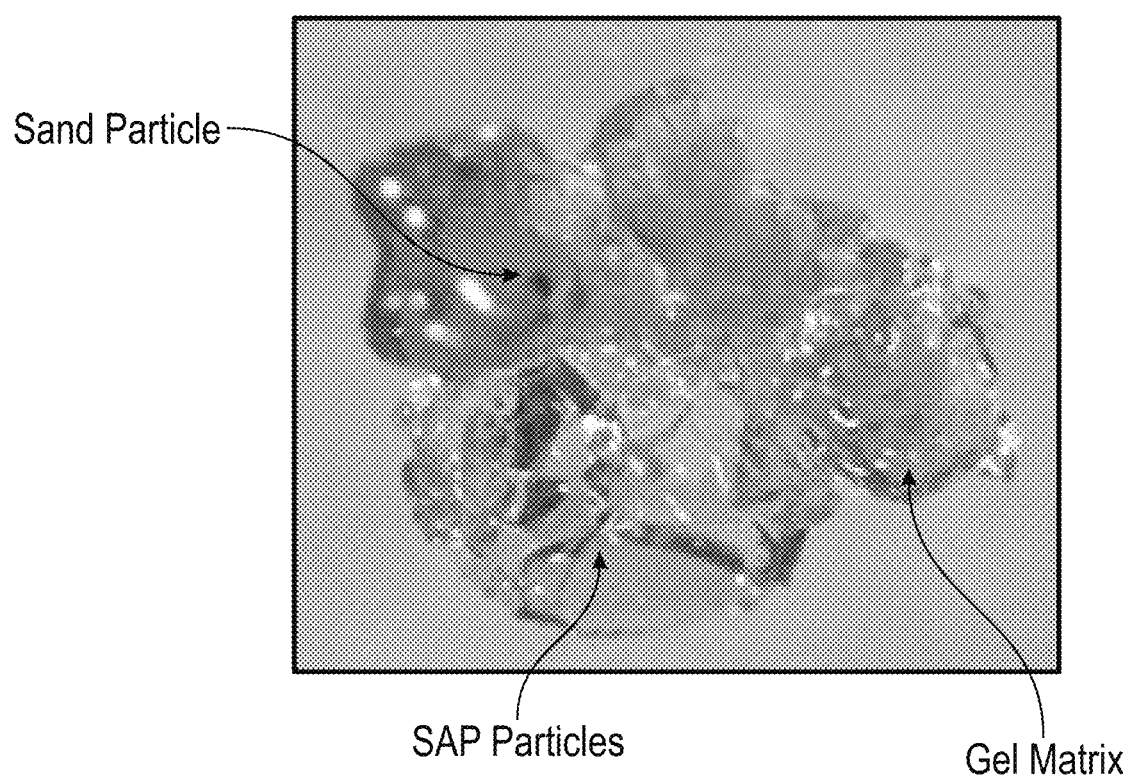
FIG. 4 is a photograph of a dried particle including proppant and a swellable material.

A 2 or 4% CMC solution with sand suspended in it was prepared as described above. The swelling material was homogenized with the suspension prior its addition to the AlCl$_3$ solution by the above method. Shortly after addition of the suspension and vigorous stirring, the AlCl$_3$ solution was discharged and the particles formed in the solution were dried. These particles included proppant and swelling material that were trapped inside CMC gel (see FIG. 4). Because a short contact time was employed, the particles were crosslinked just at the surface. This was verified after cutting the formed particles and inspecting the cross-section of the particle, which included a non-crosslinked CMC interior.

Figure 5:
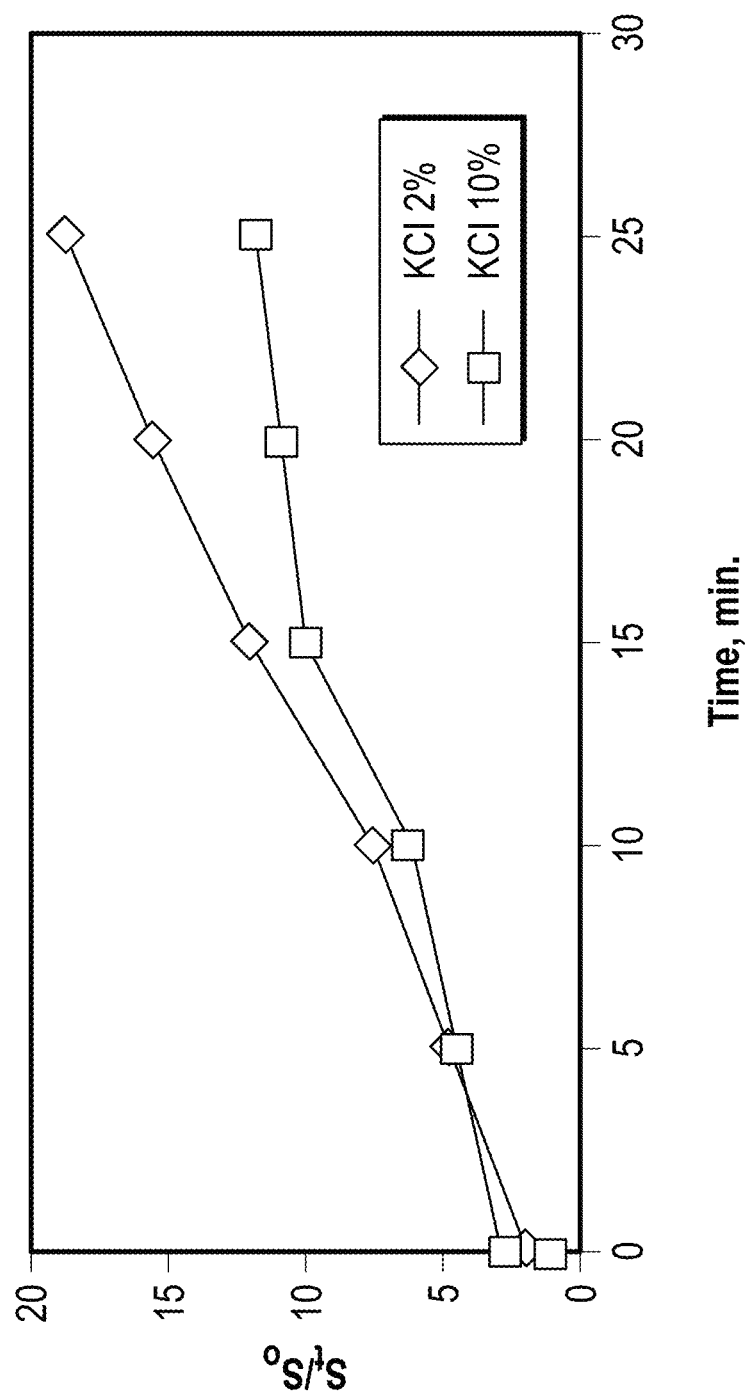
FIG. 5 is an illustration of data relating to the swelling properties of interfacially cross-linked gel particles with swelling material additives.

The swelling properties of interfacially cross-linked gel particles with swelling material additives also depend on electrolyte concentration, as illustrated in FIG. 5. In these experiments, the cross sectional swelling ratio ($S_t/S_0$) was determined for each particle individually through optical microscope as a function of time. $S_0$ was determined from a photo taken at the start of the swelling process (at time zero) as follows: (i) the irregular shape of the particle on the photo was approximated with an ellipse, (ii) the major radius, $R_1$, and the minor radius, $R_2$, of this ellipse were measured on the photo, (iii) the corresponding real particle radiuses were calculated by via the integrated magnification factor of the microscope and the camera. The following formula was used to obtain the particle cross section: $S_0=\pi R_1 R_2$, where the radii represent the real particle radius already adjusted by the magnification factor. $S_t$ was calculated the same manner as $S_0$ except the photo taken at time t was used. After a short contact interval with AlCl$_3$ solution, the particle was put in a solution of KCl/NaCl (different concentrations were tested). The dimensions of swollen particles were read via the microscope and the cross sectional swelling ratio was calculated. The particle size of the swelling material additive was in the 100-150 micrometer range.

Although the preceding description has been described herein with reference to particular means, materials and embodiments, it is not intended to be limited to the particulars disclosed herein; rather, it extends to all functionally equivalent structures, methods and uses, such as are within the scope of the appended claims. Furthermore, although only a few example embodiments have been described in detail above, those skilled in the art will readily appreciate that many modifications are possible in the example embodiments without materially departing from the disclosure of METHODS OF TREATING SUBTERRANEAN FORMATIONS WITH FLUIDS COMPRISING PROPPANT CONTAINING PARTICLE. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112(f) for any limitations of any of the claims herein, except for those in which the claim expressly uses the words 'means for' together with an associated function.

The invention claimed is:

1. A method for treating a subterranean formation comprising:
   introducing a treatment fluid including a composite particle, which comprises proppant incorporated into or attached to one or more swellable materials, into a subterranean formation via a wellbore; and
   increasing the buoyancy of the composite particle comprising proppant by mixing it with a treatment fluid and triggering the one or more swellable materials to swell,
   wherein the triggering comprises adjusting at least one parameter selected from the group consisting of a temperature, an ionic concentration of the treatment fluid, a pH of the treatment fluid and a solvent concentration of the treatment fluid.

2. The method of claim 1, wherein the buoyancy of the composite particle comprising proppant is increased at a surface before the treatment fluid including the composite particle comprising proppant is introduced into the wellbore.

3. The method of claim 1, wherein the buoyancy of the composite particle comprising proppant is increased within the wellbore after the treatment fluid including the composite particle comprising proppant has been introduced into the wellbore.

4. The method of claim 1, wherein the at least one parameter is adjusted at a surface of the wellbore before the treatment fluid including the composite particle comprising proppant is introduced into the wellbore.

5. The method of claim 1, wherein the buoyancy of the composite particle comprising proppant is increased at one or more underground locations selected from the group consisting of the subterranean formation and a fracture within the subterranean formation.

6. The method of claim 1, wherein the buoyancy of the composite particle comprising proppant is increased within a fracture of the subterranean formation.

7. The method of claim 1, wherein triggering the one or more swellable materials expands the size of the composite particle comprising proppant by a factor of at least 2.

8. The method of claim 1, wherein after triggering the one or more swellable materials of the composite particle comprising proppant to swell, the composite particle comprising proppant has a final size, as measured by the longest dimension, in the range of from about 0.5 mm to about 50 mm.

9. The method of claim 1, wherein the treatment fluid is selected from the group consisting of a fluid loss control pill, a water control treatment fluid, a scale inhibition treatment fluid, a fracturing fluid, and a gravel packing fluid.

10. The method of claim 1, wherein the composite particle comprising proppant is an aggregated composite particle comprising multiple proppants completely or partially embedded within the one of more swellable materials.

11. The method of claim 1, wherein the one or more swellable materials are present in the composite particle comprising proppant in an amount of from about 1% to about 90% by weight based on the total weight of the fully swelled composite particle comprising proppant.

12. The method of claim 1, wherein after contacting the treatment fluid, the one or more swellable materials increases in volume by factor of from about 2 times to about 300 times based on the initial volume of the one or more swellable materials in the composite particle comprising proppant.

13. The method of claim 1, wherein the proppant is present in the composite particle comprising proppant an amount of from about 1% to about 90% by weight based on the total weight of the fully swelled composite particle comprising proppant.

14. The method of claim 1, wherein the composite particle comprising proppant comprises one or more fibers.

15. The method of claim 1, wherein after triggering the one or more swellable materials of the composite particle comprising proppant to swell, a density of the composite particle comprising proppant is in the range of from about 2 g/ml to about 1 g/ml.

16. The method of claim 1, wherein after triggering the one or more swellable materials of the composite particle comprising proppant to swell, an aspect ratio of the composite particle comprising proppant is in the range of from about 1 to about 100.

17. The method of claim 1, wherein a fully swelled diameter of the composite particle comprising proppant is in the range of from about 0.5 mm to about 50 mm.

18. The method of claim 1, wherein introducing the treatment fluid comprises injecting the treatment fluid into a formation adjacent to a wellbore in the subterranean formation at a pressure sufficient to create a fracture in the formation, the fracture having opposing faces.

19. The method of claim 1, wherein the composite particle comprising proppant is prepared by binding one or more swellable crosslinked gel pieces to the proppant via an adhesive material.

20. The method of claim 1, wherein the composite particle comprising proppant is prepared via an emulsion process.

21. The method of claim 20, wherein the emulsion process is a water-in-oil emulsion polymerization process in which one or more hydrophilic proppants are included in aqueous emulsion droplets.

22. The method of claim 20, wherein the emulsion process is an oil-in-water emulsion polymerization process in which one or more hydrophobized proppants are included in organic emulsion droplets.

23. The method of claim 1, wherein the composite particle comprising proppant comprises a solid foam that completely or partially covers the proppant.

24. The method of claim 23, wherein the solid foam of the composite particle comprising proppant has a closed pore structure.

25. The method of claim 1, wherein the composite particle comprising proppant is prepared by forming one or more swellable materials comprising a high fluid content gel on the proppant.

* * * * *